(12) United States Patent
Ricard et al.

(10) Patent No.: US 7,720,658 B2
(45) Date of Patent: May 18, 2010

(54) METHOD OF UPSCALING ABSOLUTE PERMEABILITIES TO CONSTRUCT A FLOW SIMULATION MODEL

(75) Inventors: Ludovic Ricard, Issel (FR); Mickaële Le Ravalec-Dupin, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 826 days.

(21) Appl. No.: 11/443,256

(22) Filed: May 31, 2006

(65) Prior Publication Data

US 2006/0277012 A1    Dec. 7, 2006

(30) Foreign Application Priority Data

Jun. 2, 2005 (FR) .................................. 05 05679

(51) Int. Cl.
G06G 7/48 (2006.01)
(52) U.S. Cl. .................... 703/10; 166/245; 166/369; 166/252.4
(58) Field of Classification Search ............... 703/10, 703/2; 702/13, 6; 73/152.06; 166/245, 369, 166/252.4
See application file for complete search history.

(56) References Cited

U.S. PATENT DOCUMENTS

| | | | | |
|---|---|---|---|---|
| 5,450,568 A * | 9/1995 | Saji et al. | ................ | 716/20 |
| 5,663,499 A * | 9/1997 | Semmelbeck et al. | .... | 73/152.06 |
| 5,812,423 A * | 9/1998 | Maisotsenko et al. | .......... | 703/9 |
| 6,106,561 A * | 8/2000 | Farmer | .................. | 703/10 |
| 6,810,370 B1 * | 10/2004 | Watts, III | .................. | 703/10 |
| 6,823,297 B2 * | 11/2004 | Jenny et al. | .................. | 703/2 |
| 6,826,520 B1 * | 11/2004 | Khan et al. | .................. | 703/10 |
| 6,928,399 B1 * | 8/2005 | Watts et al. | .................. | 703/2 |
| 7,177,764 B2 * | 2/2007 | Stone | .......................... | 702/6 |
| 7,426,460 B2 * | 9/2008 | Noetinger et al. | ............. | 703/10 |
| 2003/0078733 A1 * | 4/2003 | Stone | .......................... | 702/13 |
| 2003/0103551 A1 * | 6/2003 | Haddad et al. | .............. | 374/136 |

(Continued)

FOREIGN PATENT DOCUMENTS

GB          2390714 A  *  1/2004

(Continued)

OTHER PUBLICATIONS

Todd Arbogast, Jim Douglas, Ulrich Hornung, Modeling of Naturally Gracture Reservoirs by Formal Homogenization Techniques, 1991 Mathematics Subject Classification, 76S05 Dept. of Mathematics, Purdue University, West Lafayette, Indiana.*
T. M. Hegre, V. Dalen, A. Henrique, Statoil, Generalized Transmissibilities for Distorted Grids in Reservoir Simulation, SPE15622, Oct. 1986.*
M.J. King, Mark Mansfield, Flow Simulation of Geologic Models, SPE Reservoir Eval. & Eng. 2 (4), Aug. 1999.*

(Continued)

*Primary Examiner*—Kamini S Shah
*Assistant Examiner*—Cuong V Luu
(74) *Attorney, Agent, or Firm*—Antonelli, Terry, Stout & Kraus, LLP.

(57) ABSTRACT

The invention is a method for calculating the inter-cell absolute permeability values associated with a reservoir model at the scale of the flow simulations representative of the porous medium from the absolute permeability values associated with a geologic model representative of the same porous medium.

6 Claims, 1 Drawing Sheet

U.S. PATENT DOCUMENTS

| | | | |
|---|---|---|---|
| 2003/0220739 A1* | 11/2003 | Feldman et al. | 702/2 |
| 2004/0148144 A1* | 7/2004 | Martin | 703/2 |
| 2004/0148147 A1* | 7/2004 | Martin | 703/10 |
| 2004/0199329 A1* | 10/2004 | Stone | 702/13 |
| 2005/0119911 A1* | 6/2005 | Ayan et al. | 705/1 |
| 2005/0177354 A1* | 8/2005 | Jenny et al. | 703/10 |
| 2006/0149520 A1* | 7/2006 | Le Ravalec-Dupin et al. | 703/10 |
| 2006/0184347 A1* | 8/2006 | Noetinger et al. | 703/10 |
| 2007/0027666 A1* | 2/2007 | Frankel | 703/10 |
| 2007/0038375 A1* | 2/2007 | Jalali et al. | 702/6 |

FOREIGN PATENT DOCUMENTS

| | | | |
|---|---|---|---|
| JP | 07311061 A | * | 11/1995 |
| JP | 07311519 A | * | 11/1995 |
| JP | 11211744 A | * | 8/1999 |
| JP | 2006208171 A | * | 8/2006 |
| JP | 2006272218 A | * | 10/2006 |
| WO | WO 00/79423 A | | 12/2000 |

OTHER PUBLICATIONS

Durlofsky, L., et al: "Scale Up of Heterogeneous Three dimensional Reservoir Descriptions", SPE Annual Technical Conference and Exhibition, No. 30709, Oct. 22, 1995, pp. 13-326, XP002186719.

Durlofsky, L. J., "Numerical Calculation of Equivalent Grid Block Permeability Tensors for Heterogeneous Porous Media", Water Resources Research, American Geophysical Union, US, vol. 27, No. 5, May 1991, pp. 699-708, XP 008033632, ISSN: 0043-1397.

Aziz, K. and Settari, A., 2002, "Petroleum Reservoir Simulation" Elsevier Applied Science Publishers, London, Section 7.3, pp. 209-229, entitled "Flow of a single Fluid in Two Dimensions".

Durlofsky, L.J., 2003, "Upscaling of Geocellular Models for Resrvoir Flow Simulation: A Review of Recent Progress," Baden-Baden, Germany, 7$^{th}$ International forum on Reservoir Simulation, pp. 1-58.

* cited by examiner

METHOD OF UPSCALING ABSOLUTE PERMEABILITIES TO CONSTRUCT A FLOW SIMULATION MODEL

BACKGROUND OF THE INVENTION

1. Field of the Invention

The present invention relates to a method of upscaling absolute permeability values associated with a fine scale model representative of a porous medium to the inter-cell absolute permeability values associated with a model representative of the porous medium at the flow simulation scale.

2. Description of the Prior Art

The objective of reservoir engineering is to predict the dynamic behavior of the subsoil in order to maximize hydrocarbon production. Models representative of the reservoirs, as accurate as possible in relation to the data collected (logs, seismic data, outcrop data, production data, . . . ), therefore have to be constructed and the production of these constrained reservoirs has to be estimated by flow simulations. It is desired, insofar as a reservoir model compatible with the whole of the data is available, to reduce the uncertainty on the production predictions. Prior to flow simulation, the reservoir is characterized in terms of geometry and petrophysical properties in form of numerical models. In the case of complex models containing a large number of details, the numerical simulations may require considerable computer resources. They have to be reduced for economic reasons while maintaining a good compromise between quickness and result accuracy.

When a physical phenomenon has to be studied, the physical equations assumed to be representative of this phenomenon and a N-dimensional domain (N>0 is generally two or three) on which the phenomenon in question acts first have to be determined. The physical phenomena encountered are of very diverse natures, examples thereof being: reaction, convective or diffusive mechanisms.

The equations are generally ordinary differential equations or partial differential equations. The system of equations thus defined is commonly referred to as physical model of the phenomenon. Numerical simulation of this model solves numerically the system of equations for the model in question. The equations of the model are conventionally solved using finite volume, finite element and mixed finite element type approaches. Once the equation solution approach and the domain are selected, the system of equations is discretized according to a sampling defining points over the entire domain. These points are also referred to as grid nodes or simply nodes. A link acts as a bond between two neighboring nodes. A cell is defined by the volume contained in a closed surface connecting several grid nodes. A face is the link between two neighboring cells. The grid of a domain contains all of the nodes in the domain. For each physical parameter, a value thereof is associated with either a cell or a node, depending on the equation discretization approach which is used. According to the nature of the physical phenomenon studied, certain equation solution approaches are more suitable than others. For example, when a pure diffusive problem is to be solved, finite elements provide more accurate results than finite volume type approaches. On the other hand, finite volume approaches allow for better accounting of convective and diffusive phenomena.

In petroleum engineering, most numerical models are associated with a structured grid. Within a structured grid, a cell has a fixed number of faces and thus of neighboring cells. This type of grid is simple to construct and writing of the equations is relatively simple. Examples thereof are Cartesian grids, radial grids or Corner Point Geometry type grids. Such grids are for example described in the following documents:

Pointing, D. K., 1989, Corner Point Geometry in Reservoir Simulation, Joint IMA/SPE European Conference on the Mathematics of Oil Recovery, Balaven-Clermidy, S., 2001, "Génération de Maillages Hybrides Pour la Simulation des Réservoirs Pétroliers", PhD Thesis, Ecole des Mines, Paris.

However, these grids do not offer great flexibility, notably to account for the faults, the wells and the spatial variability of the physical properties. To overcome this problem, reservoir engineers use unstructured grids. In an unstructured grid, the cells have a variable number of faces, therefore of neighboring cells. Such grids are known in the art. Examples thereof are Voronoi type grids and grids with local refinements. Such grids are for example described in the following documents:

Palagi, C. L. and Aziz, K.: "Use of Voronoi Grid in Reservoir Simulation", paper SPE 22889 presented at the 66$^{th}$ Annual Technical Conference and Exhibition, Dallas, Tex., 1991, Lepage, F.: "Génération de Maillages Tridimensionnels Pour la Simulation des Phénomènes Physiques en Géoscience", PhD Thesis, Institut National Polytechnique de Lorraine, 2003.

In this case, the equation solution methods are more complex to write, but the geometry of the complex objects of the domain is better reproduced than with structured grids. The nature of the physical phenomena involved in petroleum engineering leads engineers to preferably use, for flow simulations, approaches based on the calculation of flows between the cells. Examples of the approaches used are the mixed finite elements and the finite volumes. Such techniques are for example described in the following documents:

Brezzi, F. and Fortin, M., "Mixed and Hybrid Finite Element Method", Springer-Verlag, New York, 1991, Eymard, R., Gallouët, T. And Herbin, R., "Finite Volume Methods", in Ciarlet, P. G. and Lions, J. L., "Handbook of Numerical Analysis", 2000.

These approaches require calculation of the flows of conservative quantities through each face of the grid cells. Values therefore have to be available for the petrophysical properties at the faces. The petrophysical properties that can be studied are, for example, the porosity, the absolute permeability, the relative oil, oil and gas permeabilities, the fluid velocities, the capillary pressure or the saturation of the various fluids.

Construction of a numerical model of the subsoil compatible with all the data available can lead to a numerical model comprising a very large number of details. This numerical model is commonly referred to as geologic model. The stage of flow simulation on such a model is then very slow because the computing time required is expressed, at best, as a linear function of the number of cells. It is then commonplace in oil reservoir engineering to resort to the creation of a new numerical model whose associated grid comprises less cells. This new numerical model will be referred to as reservoir model hereafter. The stage of flow simulation on the reservoir model requires acceptable computing times. During construction of the reservoir model, it is necessary to assign the associated petrophysical property values to each cell of the grid of this model. For a numerical model, a geometrical quantity characteristic of each cell associated with the model is defined. This quantity is called scale. In a numerical model, a property is known at a given scale. When using the reservoir model, the scale of the properties of the medium changes. A stage of upscaling the properties in question is then necessary.

Since the dynamic behavior of the subsoil is very complex, during the upscaling procedure, successive stages are used to calculate one after the other the various petrophysical properties that will make up the reservoir model. The first one is the absolute permeability. The absolute permeability is the petrophysical property that accounts for the ability of the rock to allow the fluid to flow through the pores thereof. Considering the complex geologic structure of the subsoil, the absolute permeability is a spatially heterogeneous property. It is generally calculated, for the geologic model, by means of samples taken in wells. The value of the absolute permeability associated with each cell of the geologic model is assumed to be constant on the cell in question. Since the absolute permeability is a non-additive variable, upscaling thereof cannot be considered from a simple law. This problem has led to the development of many techniques such as heuristic approaches, the homogenization theory or numerical approaches. These techniques are for example described in the following documents:

Renard, Ph. And Marsily, G. de, 1997, Calculating Equivalent Permeability: A Review. Advances in Water Resources, 20:253-278, Durlofsky, L. J., 2003, Upscaling of Geocellular Models for Reservoir Flow Simulation: A Review of Recent Progress, Baden-Baden, Germany, 7$^{th}$ International Forum on Reservoir Simulation.

Homogenization methods were developed for analysis of statistically homogeneous permeability fields and heuristic methods for particular configurations such as stratified media or lognormal distribution two-dimensional media. In any case, resorting to numerical methods is imperative. These methods are based on the definition of one or more equivalence criteria. The criteria generally used do not directly apply to permeabilities, but to additive and conservative variables such as the mass or the energy dissipated by the system. Computation of these criteria requires fine-scale and sometimes coarse-scale single-phase flow simulations. In fact, these upscaling methods are referred to as numerical.

Numerical methods for absolute permeability upscaling can be classified according to the size of the domain of the geologic model involved in the flow simulations. To carry out a flow simulation, the absolute permeability values and the associated grid contained in the domain in question are extracted from the geologic model. It is referred to as a local method when the domain is equal to the volume of the cell of the reservoir model whose associated permeability value is to be calculated. Neighborhood-based methods involve a domain that is larger than the volume of the cell of the reservoir model whose associated permeability value is to be calculated. Finally, for global methods, the domain of the flow simulation is the complete geologic model. Unlike local methods and neighborhood-based methods, global methods allow to apprehend the large-scale connectivity that is observed in the geologic model. Such techniques are described for example in the following documents:

Khan, S. A. and Dawson, A. G., Methods of Upscaling Permeability for Unstructured Grids, U.S. Pat. No. 6,826,520 B1, 30 Nov. 2004, Pickup, G. E., Jensen, P. S., Ringrose, P. S. and Sorbie, K. S., A method for Calculating Permeability Tensors Using Perturbed Boundary Conditions, Third European Conference on the Mathematics of the Oil Recovery, 1992, Chen, Y., Durlofsky, L. J., Gerritsen, M. And Wen X. H., A Coupled Local-Global Upscaling Approach for Simulating Flow in Highly Heterogeneous Formations, Advances in Water Resources, 26(2003) 1041-1060.

Flow simulations on the reservoir model involve approaches based on the calculation of flows between the cells. In order to evaluate these flows, the petrophysical properties along the faces of the cells have to be known. The inter-cell transmissivities are commonly used to calculate the flows. The inter-cell transmissivity allows quantification of the numerical flow passing through the face in question. It depends on the flow simulation solution method and on the value of the inter-cell absolute permeability. The inter-cell absolute permeability is defined as the value of the absolute permeability along the face. Calculation of the inter-cell absolute permeability values from the absolute permeability values of the cells cannot be considered from a simple law within a general context. Approximate formulas exist. Such techniques are for example described in the following documents:

Peaceman, D. W., 1977, Fundamentals of Numerical Reservoir Simulation, Elsevier scientific pub., New York, Journel, A. G., Deutsch, C. And Desbarats, A. J., 1986, Power Averaging for Block Effective Permeability, paper SPE15128 presented at the 56$^{th}$ California Regional Meeting of SPE, Society of Petroleum Engineers, Long Beach.

However, an error on the estimation of the inter-cell permeability is made. This result is underscored in the following document:

Romeu, R. K. and Noetinger, B., 1995, Calculation of Internodal Transmissivities in Finite Difference Models of Flows in heterogeneous Porous Media, Water Resources Research, 31(4), 943-959.

An important point of the upscaling stage is the nature of its result. Existing methods of absolute permeability upscaling calculate either the absolute permeability values associated with the grid cells of the reservoir model, or the inter-cell transmissivity values. There is no method for determining the inter-cell permeability values of the reservoir model.

The method allowing upscaling of a geologic model, that is to construct a numerical reservoir model representative of a porous heterogeneous medium, therefore has to meet several requirements:

1. The method must be independent of the structure and of the shape of the grid associated with the numerical reservoir model.
2. The method must allow, if need be, to reproduce on the reservoir model the large-scale connectivity of the geologic model.
3. The method must limit flow simulation errors through the use of the inter-cell permeabilities.

SUMMARY OF THE INVENTION

The method according to the invention deals with calculation of the inter-cell permeability values of the reservoir model whatever the shape and the structure of the grid associated with this model In particular, the method according to the invention applies to the construction of a numerical model for representing the spatial distribution, in an underground zone, of the absolute permeability. It aims to provide engineers with means for precisely estimating the reserves of an oil reservoir and for optimizing recovery of these reserves by studying various production schemes.

The invention relates to a method for calculating the inter-cell absolute permeability values associated with a reservoir model at the scale of flow simulations representative of the porous medium, from the absolute permeability values associated with a geologic model representative of this porous medium, wherein the following stages are carried out:

discretizing in space the reservoir model by means of a grid;

carrying out a steady single-phase flow simulation on the geologic model;

isolating a spatial domain of non-zero volume containing each one of the faces of the grid cells of the reservoir model, and extracting from the geologic model the cells of the model contained in domain, as well as the associated absolute permeability, pressure, pressure gradient and filtration rate values so as to have a local model relative to the face considered;

calculating a mean value of the filtration rate vector relative to the local model of a domain;

determining the boundary conditions of the local model relative to each face of the cells of the reservoir model by means of the results of the flow simulation on the geologic model;

sequentially perturbing the boundary conditions in three spatial directions in order to construct three sets of boundary conditions;

carrying out steady single-phase flow simulations according to these three sets of boundary conditions on each local model relative to the face considered of the reservoir model grid;

calculating the flow rate and pressure gradient values associated with each cell of the domain relative to each face; and calculating, from these values, the inter-cell absolute permeabilities associated with each cell of the reservoir model.

Flow simulation can be carried out by means of methods of discretizing partial derivative equations of five-point finite volume type.

Flow simulation can be carried out by means of methods for simulating flows in heterogeneous porous media using fast Fourier transforms.

Realistic boundary conditions can be used for flow simulation on the geologic model.

The face-related local model can be refined so as to increase the accuracy of the flow simulations on this model.

The values of the boundary condition perturbations can be calculated by means of the pressure gradient values or of the filtration rate calculated by means of the flow simulation on the geologic model.

The inter-cell permeabilities can be calculated in any base.

The inter-cell permeabilities can be used to calculate the inter-cell transmissivities.

BRIEF DESCRIPTION OF THE FIGURES

Other features and advantages of the method according to the invention will be clear from reading the description hereafter of non-limitative embodiment examples, with reference to the accompanying figures wherein.

DETAILED DESCRIPTION

The method according to the invention relates to a numerical method, based on the calculation of fluid flows, of upscaling the absolute permeability values associated with a fine scale model representative of a porous medium to the inter-cell absolute permeability values associated with a model representative of the same porous medium at the flow simulation scale. The method can be particularly used when the grid associated with the geologic model is Cartesian and whatever the grid associated with the reservoir model. The method comprises the following stages:

1. Generating the grid to be associated with the reservoir model.
2. Carrying out a steady single-phase flow simulation on the geologic model.
3. For each face of each one of the cells of the reservoir model, isolating a spatial domain of non-zero volume containing it. Extracting then from the geologic model the cells of the model contained in the previously calculated domain, as well as the associated absolute permeability, pressure, pressure gradient and filtration rate values. A fine scale local model relative to the face considered is thus obtained.
4. For each domain relative to a face, a mean value of the filtration rate vector relative to this local domain is calculated.
5. With the same results, the boundary conditions of the local domain relative to each face of the cells of the reservoir model are constructed. These boundary conditions are sequentially perturbed in the three spatial directions.
6. Steady single-phase flow simulations are then carried out according to these three boundary condition sets on each local model relative to the face considered of the reservoir model grid.
7. From the results of these three flow simulations, the flow rate and pressure gradient values associated with each cell of the domain relative to each face is calculated.
8. Finally, from these results the inter-cell absolute permeability values associated with each cell of the reservoir model are calculated.

The eight stages are described in detail hereunder:

1. Generation of a Flexible Grid

Generation of a flexible grid is an operation that is well known in the art. Such a grid is for example described in the aforementioned document by S. Balaven-Clermidy (2001).

Figure 1:
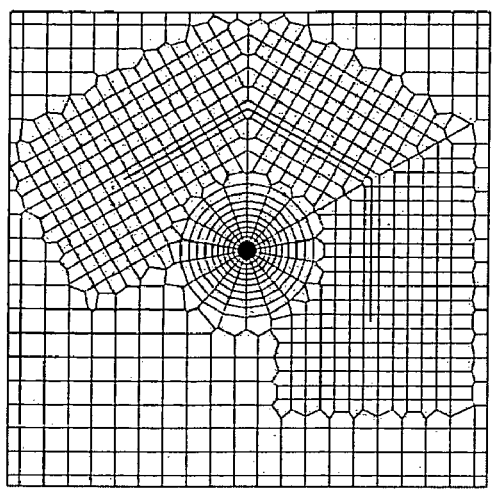
FIG. 1 illustrates a two-dimensional structured grid associated with the geologic model representative of a porous medium.

A radial grid can for example be generated around vertical wells, an orthogonal fine grid around horizontal wells and a regular Cartesian grid far from the wells. FIG. 1 illustrates an unstructured grid that can be associated with a reservoir model.

Within the scope of the method according to the invention, this grid can also be provided as initial data.

2. Steady Single-Phase Flow Simulation

Figure 2:
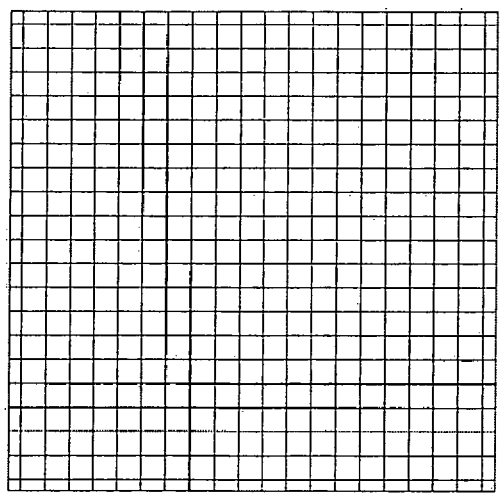
FIG. 2 illustrates a two-dimensional unstructured grid associated with the reservoir model representative of a porous medium.

A flow simulation, generally a steady single-phase flow, associated with a set of boundary conditions, is then carried out on the whole domain of the geologic model. The geologic model is assumed to be associated with a Cartesian grid. Such a grid is illustrated for example by FIG. 2. The set of boundary conditions can be any set. The flow of a single fluid under steady flow conditions in a porous medium is governed by Darcy's law:

$$U = -\frac{K}{\eta} grad(P) \tag{1}$$

where U is the filtration rate, K the permeability and P the pressure of the fluid. $\eta$ is the viscosity of the fluid. Furthermore, the fluid being incompressible, the mass conservation equation is written as follows:

$$div(U)=0 \quad (2$$

By combining the two equations above, the following diffusivity equation is obtained:

$$div\left(\frac{K}{\eta}grad(P)\right)=0 \quad (3$$

In order to simplify the developments hereafter, the viscosity of the fluid is assumed to be invariant in space.

Whatever the technique used to solve this equation, the corresponding pressure fields and velocities are to be estimated for a given permeability field. Among these methods, the methods based on the calculation of flows at the interfaces between cells and Fourier transform methods are notably distinguished.

The methods based on the calculation of flows require calculation of the flows at the interfaces between the cells. These methods are well known in the art. Such methods are for example described in the aforementioned documents by Brezzi, F. and Fortin, M., (1991), and Eymard, R., et al., (2000). To know these flows, it is necessary to calculate the inter-cell transmissivity. The inter-cell transmissivity of a face is defined as the ability of the given fluid to flow through the face in question under the constraint of a pressure gradient. The inter-cell transmissivity is expressed as follows:

$$T_{ij} = \frac{k_{ij}A}{\Delta s} \quad (4$$

with $k_{ij}$ the inter-cell permeability of the face, A the surface area of the face between cell i and cell j, $\Delta s$ the characteristic distance traveled by the fluid between the center of cell i and the center of cell j. Calculation of the inter-cell transmissivities is well known in the art. Such methods are for example described in the aforementioned documents by Peaceman, D. W., (1977) and Journel, A. G. et al., (1986). The results of these methods based on the calculation of flows are the pressure gradient values, the values of the filtration rates at the interfaces between the cells and the pressure values at the centre of the cells.

It is also possible to apply simulation methods using fast Fourier transforms. Such techniques are for example described in French patent application 04/05,212 filed by the assignee. This technique allows knowledge of the pressure values, the filtration rates and the pressure gradients at the center of the numerical model cells.

3. Construction of the Local Model Relative to Each Face

Figure 3:
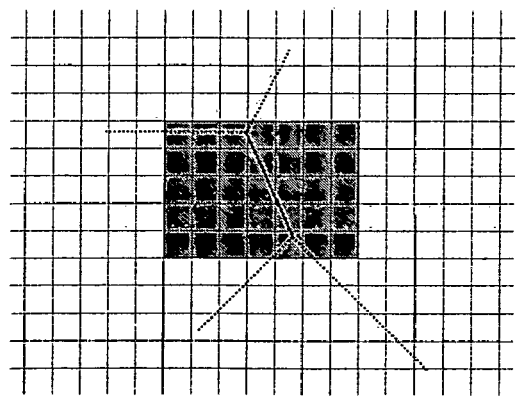
FIG. 3 illustrates the two-dimensional domain relative to a face.

For each face of the grid associated with the reservoir model, a domain of right-angled rectangle type of non-zero volume entirely containing the face in question is isolated. FIG. 3 shows the isolated domain, partly shaded, which encompasses the face of a cell, in full line. The dotted lines represent the other faces of the cells in contact.

For each direction, the size of the domain in this direction is a whole number of cells of the geologic model. If this is not the case, the domain is enlarged in this direction so as to contain a whole number of cells of the geologic domain. What is referred to as the face-related local model is the geologic model restricted to the domain described above. The absolute permeability values associated with the cells of the face-related local model are identical to those of the corresponding cells in the geologic model.

If the characteristic lengths of the domain are less than twice the characteristic lengths of the cells of the geologic model, a grid refining stage is necessary. The absolute permeability values associated with the cells of the local model are then calculated by means of a downscaling stage. Such a technique is for example described in French patent application 04/09,824 filed by the assignee.

The domain of the face-related local model is referred to as staggered cell hereafter.

4. Calculation of the Mean Values Relative to the Local Model of Each Face

For each model relative to a staggered cell, the mean value of the filtration rate relative to the local model is calculated for the three components of the filtration rate. It is obtained by adding up all of the values of the component of the sought rate of the local model and averaging in the direction sought.

$$U_{x_i}^c = \frac{1}{n}\sum_{j=1}^{n} U_{x_i}^j \quad (5$$

with $U_{x_i}^j$ the component in direction $x_i$ of the filtration rate of geologic cell j, $U_{x_i}^c$ the component in direction $x_i$ of the filtration rate of the local model and n the number of cells of the local model in the direction sought.

5. Calculation of the Three Sets of Boundary Conditions for Each Local Model Relative to a Face of the Reservoir Model Grid If a flow simulation method based on flow calculation is available, the boundary conditions that are taken into account are of Dirichlet type, that is the value of the pressure is set along the boundaries of the domain.

Calculation of the pressure value to be applied to the faces of the staggered cell first requires determination of a mean pressure value for each face. This value is calculated by means of an arithmetic mean of all the pressure values of the cells of the geologic model that are adjacent to the boundary in question. Pressure Dirichlet type boundary conditions are thus obtained on each face of the staggered cell.

To construct the first set of boundary conditions, a perturbation $\epsilon$ is added to the mean pressure values of the faces perpendicular to axis x. The mean pressure values associated with the other faces remain unchanged. Estimation of perturbation $\epsilon$ can involve the pressure gradient values or the filtration rates calculated in stage 1 of the invention.

To construct the second set of boundary conditions, from the non-perturbed boundary conditions, a perturbation is added to the mean pressure values of the faces perpendicular to axis y. The mean pressure values associated with the other faces remain unchanged.

To construct the third set of boundary conditions, from the non-perturbed boundary conditions, a perturbation is added to the mean pressure values of the faces perpendicular to axis z. The mean pressure values associated with the other faces remain unchanged.

The perturbations can be different according to the set of boundary conditions.

If a Fourier transform flow simulator as mentioned in French patent application 04/05,212 filed by the assignee is available, the boundary conditions can be calculated as in the methods based on flow calculation. It is however possible to take advantage of the iterative formulation of Fourier transform methods by calculating a perturbed pressure field for the entire model and not only the boundary conditions. In this case, one no longer refers to boundary conditions but rather to initial pressure gradient fields. Perturbing the boundary conditions is equivalent to perturbing the initial pressure gradient field. By default, the initial pressure gradient field is the pressure gradient field obtained by means of the flow simulation on the geologic model.

To construct the first perturbed pressure gradient field, a perturbation ϵ is added to each value of the pressure gradient field along axis x. The pressure gradient fields in the other directions remain unchanged.

To construct the second perturbed pressure gradient field, a perturbation ϵ is added to each value of the pressure gradient field along axis y. The pressure gradient fields in the other directions remain unchanged.

To construct the third perturbed pressure gradient field, a perturbation ϵ is added to each value of the pressure gradient field along axis z. The pressure gradient fields in the other directions remain unchanged.

6. Flow Simulations on the Local Model Relative to each Face According to the 3 Sets of Boundary Conditions From the perturbed boundary conditions or the perturbed pressure fields, single-phase flow simulations are carried out according to the same principles as those mentioned in stage 2. The results of these flow simulations are pressure, pressure gradient and filtration rate values.

7. Calculation of the Mean Values Relative to the Local Model of Each Face According to the 3 Sets of Boundary Conditions For each local model and each flow simulation on this local model, the mean values of the three components of the filtration rate vector are calculated as in stage 4. Three mean filtration rate vectors are then obtained:

$$U^{P1} = \begin{pmatrix} U_x^{P1} \\ U_y^{P1} \\ U_z^{P1} \end{pmatrix}, U^{P2} = \begin{pmatrix} U_x^{P2} \\ U_y^{P2} \\ U_z^{P2} \end{pmatrix} \text{ and } U^{P3} = \begin{pmatrix} U_x^{P3} \\ U_y^{P3} \\ U_z^{P3} \end{pmatrix} \tag{6}$$

8. Calculation of the Inter-Cell Absolute Permeability Values for Each Local Model Relative to a Face of the Grid Associated with the Reservoir Model For each face-related local model, we have the mean value of the non-perturbed filtration rate $U^c$ and the three mean filtration rate values from flow simulations with perturbed boundary conditions $U^{P1}$, $U^{P2}$ and $U^{P3}$.

In the case of flow simulation with non-perturbed boundary conditions, Darcy's law is written as follows:

$$U_x^c = -\left(k_{xx}\frac{\Delta p_x}{\Delta l_x} + k_{xy}\frac{\Delta p_y}{\Delta l_y} + k_{xz}\frac{\Delta p_z}{\Delta l_z}\right) \tag{7a}$$

$$U_y^c = -\left(k_{yx}\frac{\Delta p_x}{\Delta l_x} + k_{yy}\frac{\Delta p_y}{\Delta l_y} + k_{yz}\frac{\Delta p_z}{\Delta l_z}\right) \tag{7b}$$

$$U_z^c = -\left(k_{zx}\frac{\Delta p_x}{\Delta l_x} + k_{zy}\frac{\Delta p_y}{\Delta l_y} + k_{zz}\frac{\Delta p_z}{\Delta l_z}\right) \tag{7c}$$

with $$K = \begin{pmatrix} k_{xx} & k_{xy} & k_{xz} \\ k_{yx} & k_{yy} & k_{yz} \\ k_{zx} & k_{zy} & k_{zz} \end{pmatrix}$$

inter-cell absolute permeability tensor, $\Delta p_x, \Delta p_y, \Delta p_z$, pressure difference in directions x, y and z respectively, and $\Delta l_x, \Delta l_y, \Delta l_z$ the lengths of the staggered cell in directions x, y and z respectively.

In the case of flow simulation with boundary conditions perturbed in direction x, this law is written as follows:

$$U_x^{P1} = -\left(k_{xx}\frac{\Delta p_x - \varepsilon}{\Delta l_x} + k_{xy}\frac{\Delta p_y}{\Delta l_y} + k_{xz}\frac{\Delta p_z}{\Delta l_z}\right) \tag{8a}$$

$$U_y^{P1} = -\left(k_{yx}\frac{\Delta p_x - \varepsilon}{\Delta l_x} + k_{yy}\frac{\Delta p_y}{\Delta l_y} + k_{yz}\frac{\Delta p_z}{\Delta l_z}\right) \tag{8b}$$

$$U_z^{P1} = -\left(k_{zx}\frac{\Delta p_x - \varepsilon}{\Delta l_x} + k_{zy}\frac{\Delta p_y}{\Delta l_y} + k_{zz}\frac{\Delta p_z}{\Delta l_z}\right) \tag{8c}$$

By subtracting equation 7 from equation 8, the following relationship is obtained:

$$k_{xx} = \frac{(U_x^{P1} - U_x^c)\Delta l_x}{\varepsilon},$$

$$k_{yx} = \frac{(U_y^{P1} - U_y^c)\Delta l_y}{\varepsilon} \, et$$

$$k_{zx} = \frac{(U_z^{P1} - U_z^c)\Delta l_z}{\varepsilon}$$

(8)

By following a similar procedure with the mean filtration rate values from the flow simulations with boundary conditions perturbed in direction y, components $k_{xy}, k_{yy}, k_{zy}$ of the inter-cell absolute permeability tensor can be calculated.

$$k_{xy} = \frac{(U_x^{P2} - U_x^c)\Delta l_x}{\varepsilon},$$

$$k_{yy} = \frac{(U_y^{P2} - U_y^c)\Delta l_y}{\varepsilon} \, et$$

$$k_{zy} = \frac{(U_z^{P2} - U_z^c)\Delta l_z}{\varepsilon}$$

(9)

Finally, using the mean filtration rate values from flow simulations with boundary conditions perturbed in direction z, components $k_{xz}, k_{yz}, k_{zz}$ of the inter-cell absolute permeability tensor can be calculated.

$$k_{xz} = \frac{(U_x^{P3} - U_x^c)\Delta l_x}{\varepsilon},$$

$$k_{yz} = \frac{(U_y^{P3} - U_y^c)\Delta l_y}{\varepsilon} \, et$$

$$k_{zz} = \frac{(U_z^{P3} - U_z^c)\Delta l_z}{\varepsilon}$$

(10)

Thus, all of the components of the inter-cell absolute permeability tensor in base (x,y,z) are obtained.

For practical reasons, it may be preferable to have the inter-cell absolute permeability in a base where two vectors are coplanar to the face and the last one orthogonal thereto. To carry out such an operation, a change in the base of the absolute permeability tensor is carried out. This base change is an operation that is well known in the art. Such a technique is for example described in the following document:

Bronshtein, I. N. and Semendyayev, K. A., Handbook of Mathematics, Springer, 1997.

If it is desired to use the inter-cell transmissivities, they can be calculated from the inter-cell permeability tensor expressed in a base a vector of which is orthogonal to the face. The value of the inter-cell transmissivity associated with the face is calculated by means of the following relation:

$$T_i = \frac{AK_{\theta\theta}^i}{\Delta x_i} \quad (11)$$

with A being the surface area of the face, $K_{\theta\theta}^i$ being the component of the inter-cell permeability tensor in the direction $\theta$ orthogonal to the face and $\Delta x_i$ being the distance between the centers of the two cells defining the face.

The invention claimed is:

1. A method for optimizing recovery of reserves from an oil reservoir, from a geologic model representing the reservoir by geometry and petrophysical properties of the reservoir, with which is associated a set of absolute permeability values obtained from measurements of the reservoir and from a reservoir model associated with a grid containing grid cells with faces being constructed at a scale of steady flow simulations representative of the reservoir, comprising:

(a) upscaling the absolute permeability values with the geologic model by calculating inter-cell absolute permeability values associated with the reservoir model, including calculating pressure, pressure gradient and first filtration rate values associated with the grid cells using steady single-phase flow simulations represented with the geologic model, isolating a spatial domain of non-zero volume containing each face of the grid cells and extracting from the geologic model grid cells of the geologic model contained in the domain and an associated absolute permeability, the pressure, the pressure gradient and the first filtration rate values to provide a local model of the spatial domain relative to each face, calculating a first filtration rate mean value of the first filtration rate values relative to the local model of the spatial domain, determining boundary conditions of the local model of the spatial domain relative to each face of the grid cells by using results of the steady single-phase flow simulation with the geologic model, sequentially perturbing the boundary conditions in three spatial directions, by adding a perturbation to values of the boundary conditions along an axis in each direction to construct three sets of boundary conditions with a set of boundary conditions being associated with each direction, calculating a pressure gradient value and a second filtration rate values of each grid cell relative to each face by carrying out the steady single-phase flow simulations according to the three sets of boundary conditions for each local model relative to faces of the grid cells, calculating a second filtration rate mean value of the second filtration rate value of each grid cell for each of the three sets of boundary conditions, and using Darcy's law to calculate inter-cell absolute permeability associated with each grid cell from the first and second filtration rate mean values and pressure gradient values of each grid cell; and (b) using the inter-cell absolute permeabilities associated with each grid cell for estimating the reserves of the oil reservoir and optimizing recovery of the reserves from the reservoir.

2. A method as claimed in claim 1, wherein the flow simulation uses discretizing partial derivative equations of a five-point finite volume type.

3. A method as claimed in claim 1, wherein the flow simulation simulates flows in the oil reservoir using fast Fourier transforms.

4. A method as claimed in claim 1, wherein the local models are refined to increase accuracy of the flow simulations.

5. A method as claimed in claim 1, wherein values of the boundary condition perturbations are calculated using pressure gradient values or filtration rate values which are calculated using steady single-phase flow simulations representative of the geologic model.

6. A method as claimed in claim 1, wherein the inter-cell absolute permeability values are used to calculate the inter-cell transmissivities.

\* \* \* \* \*